(12) United States Patent
Paramashiva et al.

(10) Patent No.: US 12,486,116 B2
(45) Date of Patent: Dec. 2, 2025

(54) CORRUGATED REINFORCED PLASTIC ROLLER

(71) Applicant: Intelligrated Headquarters, LLC, Mason, OH (US)

(72) Inventors: Jayanth Paramashiva, Bangalore (IN); Kishor Mujumdar, Bangalore (IN); Charankumar Kodandaramaiah, Bangalore (IN)

(73) Assignee: Intelligrated Headquarters, LLC, Mason, OH (US)

( * ) Notice: Subject to any disclaimer, the term of this patent is extended or adjusted under 35 U.S.C. 154(b) by 166 days.

(21) Appl. No.: 18/459,726

(22) Filed: Sep. 1, 2023

(65) Prior Publication Data

US 2025/0026577 A1    Jan. 23, 2025

(30) Foreign Application Priority Data

Jul. 19, 2023    (IN) .............................. 202311048343

(51) Int. Cl.
| | |
|---|---|
| *B65G 39/09* | (2006.01) |
| *B65G 13/00* | (2006.01) |
| *B65G 39/04* | (2006.01) |
| *B65G 39/06* | (2006.01) |
| *B65G 39/02* | (2006.01) |

(52) U.S. Cl.
CPC .............. *B65G 39/09* (2013.01); *B65G 13/00* (2013.01); *B65G 39/04* (2013.01); *B65G 39/06* (2013.01); *B65G 39/02* (2013.01)

(58) Field of Classification Search
CPC ........ B65G 39/09; B65G 39/04; B65G 39/06; B65G 13/00; B65G 39/02

USPC .............................................. 492/38, 40, 49
See application file for complete search history.

(56) References Cited

U.S. PATENT DOCUMENTS

| | | | | |
|---|---|---|---|---|
| 3,662,446 | A | * 5/1972 | Walls ..................... | D06B 23/02 |
| | | | | 492/50 |
| 3,711,912 | A | 1/1973 | Teske et al. | |
| 3,907,232 | A | * 9/1975 | Odermatt ............. | B65H 54/543 |
| | | | | 57/130 |
| 4,287,649 | A | * 9/1981 | Kohler .................. | B65H 27/00 |
| | | | | 492/56 |

(Continued)

FOREIGN PATENT DOCUMENTS

| | | |
|---|---|---|
| CN | 113120510 A | 7/2021 |
| CN | 214933476 U | 11/2021 |

(Continued)

OTHER PUBLICATIONS

Extended European Search Report Mailed on Nov. 18, 2024 for EP Application No. 24181830, 8 page(s).

(Continued)

*Primary Examiner* — Mark A Deuble
(74) *Attorney, Agent, or Firm* — Alston & Bird LLP

(57) ABSTRACT

An example roller is provided. The example roller can include an outer layer having a cylindrical shape, wherein the outer layer extends between a first end and a second end. The example roller can include a first bearing disposed at the first end. The example roller can include a second bearing disposed at the second end. The example roller can include a corrugated plastic filling, wherein the outer layer is wrapped around the corrugated plastic filling.

17 Claims, 7 Drawing Sheets

(56) References Cited

U.S. PATENT DOCUMENTS

| | | | | |
|---|---|---|---|---|
| 5,759,141 A | * | 6/1998 | Schmitz | F16C 13/003 |
| | | | | 492/40 |
| 5,766,120 A | * | 6/1998 | Schmitz | F16C 13/003 |
| | | | | 492/26 |
| 5,848,958 A | * | 12/1998 | Damkj.ae butted.r | B65G 39/02 |
| | | | | 492/38 |
| 9,096,379 B2 | | 8/2015 | Gilley, Jr. et al. | |
| 11,078,025 B2 | | 8/2021 | Keller et al. | |

FOREIGN PATENT DOCUMENTS

| | | |
|---|---|---|
| CN | 215796588 U | 2/2022 |
| DE | 1980663 U | 3/1968 |
| EP | 0735287 A1 | 10/1996 |
| EP | 1159485 B1 | 7/2005 |

OTHER PUBLICATIONS

Yunfei Qu et al., "Analyses on the roller structure of equivalent honeycombs for forest harvester under impact loading," Composite Structures, 262:1-18, (Apr. 15, 2021). [Retrieved from the Internet Apr. 11, 2024: URL: <https://www.sciencedirect.com/science/article/abs/pii/S0263822320332815>].

* cited by examiner

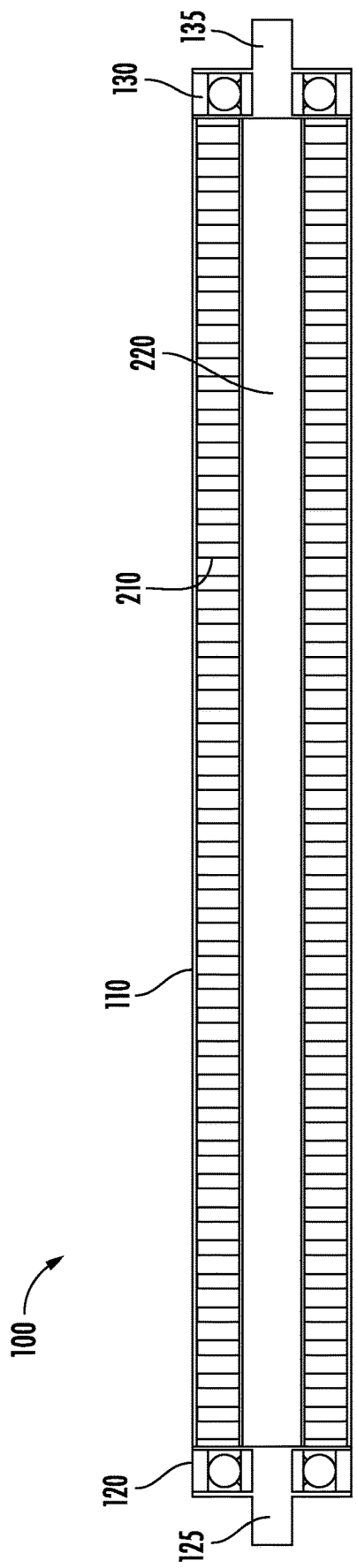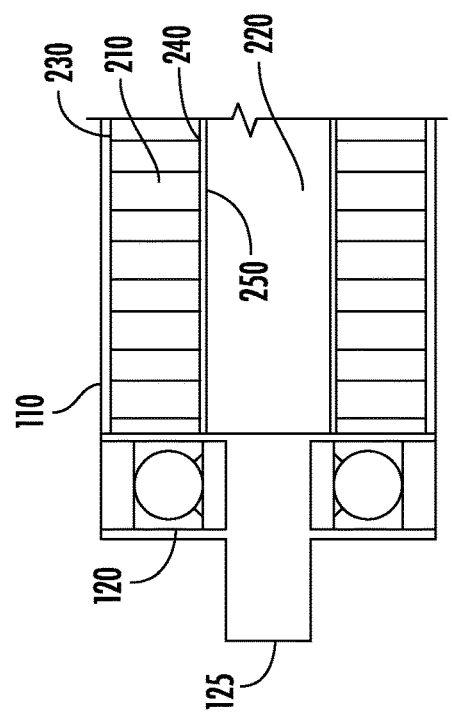

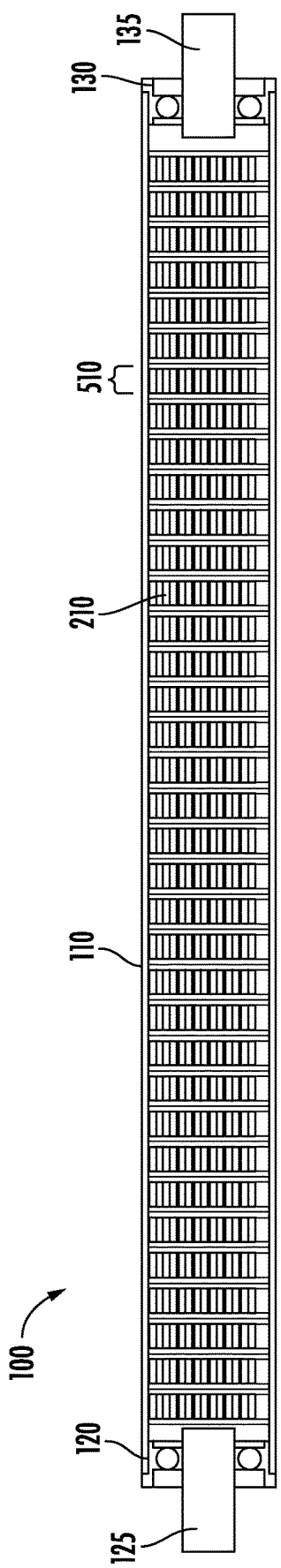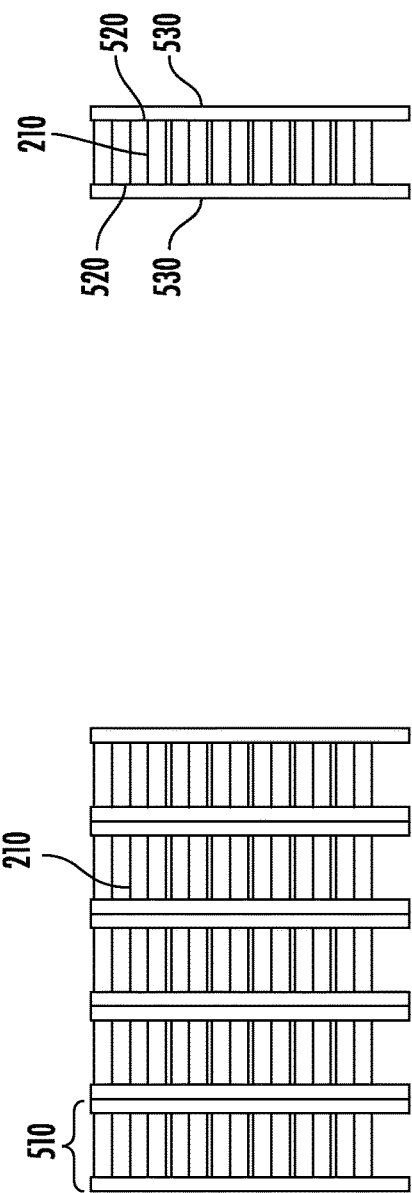

CORRUGATED REINFORCED PLASTIC ROLLER

CROSS REFERENCE TO RELATED APPLICATIONS

This application claims priority to India Provisional Patent Application No. 202311048343, filed Jul. 19, 2023, the contents of which are incorporated by reference herein in its entirety.

TECHNICAL FIELD

The present application relates generally, in some examples, to a roller. More specifically, the present application relates, in some examples, to a corrugated reinforced plastic roller.

BACKGROUND

Metal rollers are sometimes used in conveyors. For example, one or more metal rollers may be used to transport an object. The inventors have identified numerous deficiencies and problems with the existing technologies in this field. For example, existing technologies may result in excessively loud noise during transportation. In addition, existing technologies are a heavy and result in increased weight of a roller system. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In an example embodiment, a roller is provided. The example roller includes an outer layer having a cylindrical shape, where the outer layer extends between a first end and a second end. The example roller includes a first bearing disposed at the first end. The example roller includes a second bearing disposed at the second end. The example roller includes a corrugated plastic filling, wherein the outer layer is wrapped around the corrugated plastic filling.

In an example embodiment, the corrugated plastic filling defines a cylindrical shape having a hollow center.

In an example embodiment, the roller further includes a first reinforcement layer positioned between the outer layer and the corrugated plastic filling.

In an example embodiment, the roller further includes a second reinforcement layer positioned between the corrugated plastic filling and the hollow center.

In an example embodiment, the roller further includes an inner layer positioned between the second reinforcement layer and the hollow center.

In an example embodiment, at least one of the outer layer or the inner layer includes a surface treatment layer.

In an example embodiment, the corrugated plastic filling includes a plurality of corrugated sheets.

In an example embodiment, the plurality of corrugated sheets are stacked such that a space inside the outer layer and between the first bearing and the second bearing is filled.

In an example embodiment, each of the plurality of corrugated sheets defines a circular shape.

In an example embodiment, each of the plurality of sheets is stacked in a direction extending between the first bearing and the second bearing.

In an example embodiment, each of the plurality of corrugated sheets is disposed between two reinforcement layers.

In an example embodiment, each of the plurality of corrugated sheets is further disposed between two surface treatment layers.

In an example embodiment, the plurality of corrugated sheets are joined together.

In an example embodiment, the outer layer includes plastic.

In an example embodiment, at least one of the first bearing or the second bearing includes a hex shaft.

In an example embodiment, the corrugated plastic filling includes at least one of a honeycomb reinforcement structure, a bubble reinforcement structure, a rectangular reinforcement structure, or a plate reinforcement structure.

In an example embodiment, a roller conveyor system is provided. The example roller conveyor system includes one or more conveyor frames. The example roller conveyor system includes one or more conveyor legs. The example roller conveyor system includes one or more rollers. In an example embodiment, each of the rollers includes an outer layer having a cylindrical shape, where the outer layer extends between a first end and a second end. In an example embodiment, each of the rollers includes a first bearing disposed at the first end. In an example embodiment, each of the rollers includes a second bearing disposed at the second end. In an example embodiment, each of the rollers includes a corrugated plastic filling, wherein the outer layer is wrapped around the corrugated plastic filling.

In an example embodiment, the corrugated plastic filling defines a cylindrical shape having a hollow center.

In an example embodiment, each of the rollers further includes a first reinforcement layer positioned between the outer layer and the corrugated plastic filling.

In an example embodiment, each of the rollers further includes a second reinforcement layer positioned between the corrugated plastic filling and the hollow center.

In an example embodiment, each of the rollers further includes an inner layer positioned between the second reinforcement layer and the hollow center.

In an example embodiment, at least one of the outer layer or the inner layer includes a surface treatment layer.

In an example embodiment, the corrugated plastic filling includes a plurality of corrugated sheets.

In an example embodiment, the plurality of corrugated sheets are stacked such that a space inside the outer layer and between the first bearing and the second bearing is filled.

In an example embodiment, each of the plurality of corrugated sheets defines a circular shape.

In an example embodiment, each of the plurality of sheets is stacked in a direction extending between the first bearing and the second bearing.

In an example embodiment, each of the plurality of corrugated sheets is disposed between two reinforcement layers.

In an example embodiment, each of the plurality of corrugated sheets is further disposed between two surface treatment layers.

In an example embodiment, the plurality of corrugated sheets are joined together.

In an example embodiment, the outer layer includes plastic.

In an example embodiment, at least one of the first bearing or the second bearing includes a hex shaft.

In an example embodiment, the corrugated plastic filling includes at least one of a honeycomb reinforcement structure, a bubble reinforcement structure, a rectangular reinforcement structure, or a plate reinforcement structure.

BRIEF DESCRIPTION OF THE DRAWINGS

Figure 1:
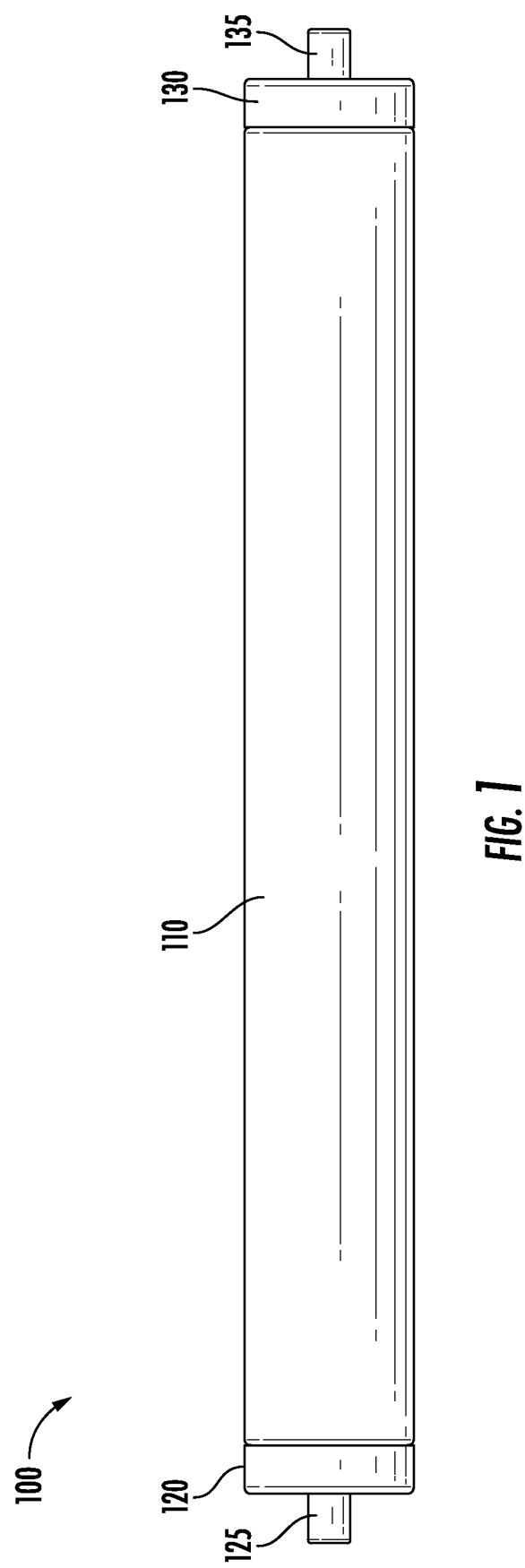

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a front view of a roller in accordance with an example embodiment of the present disclosure.

FIG. 2A provides a front cross-sectional view of a roller with a hollow center in accordance with an example embodiment of the present disclosure.

FIG. 2B provides a closeup front cross-sectional view of a roller in accordance with an example embodiment of the present disclosure.

Figure 3:
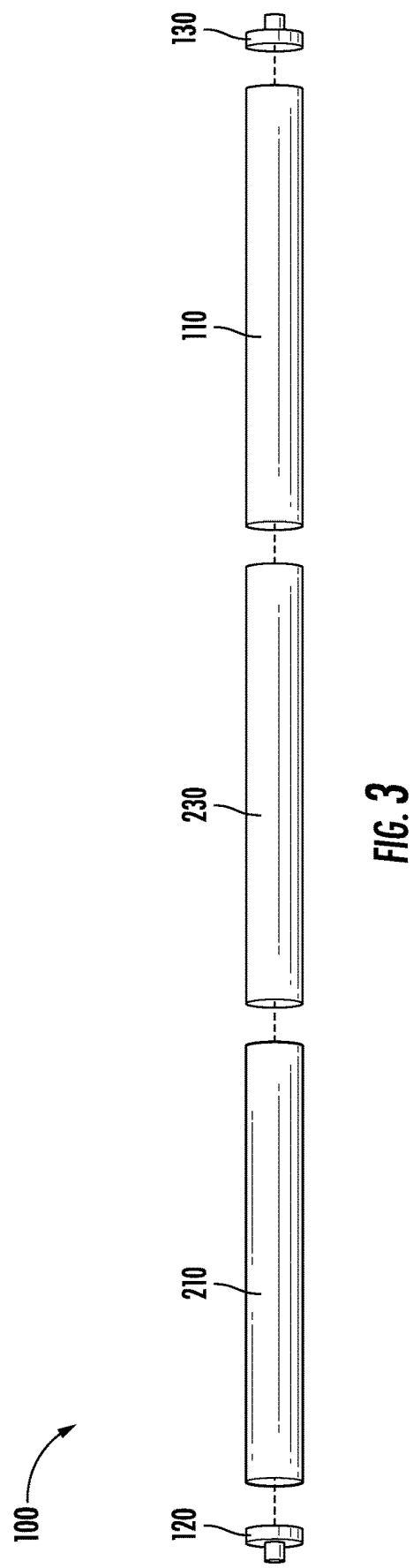

FIG. 3 provides an exploded view of a roller in accordance with an example embodiment of the present disclosure.

Figure 4D:
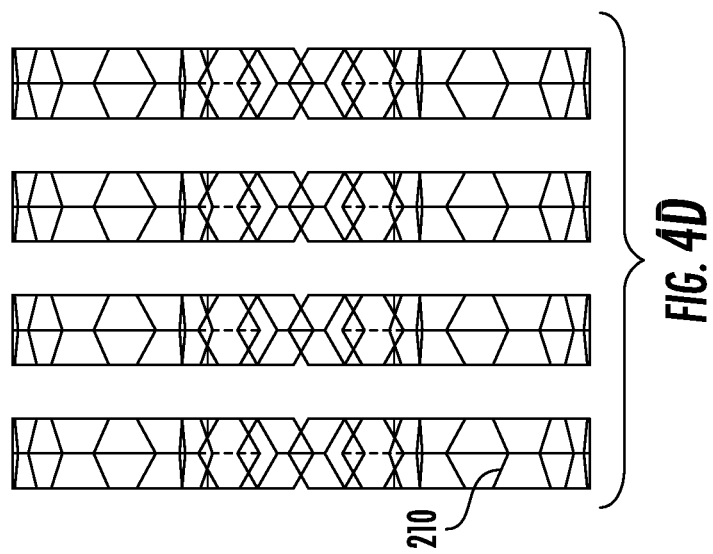
Figure 4B:
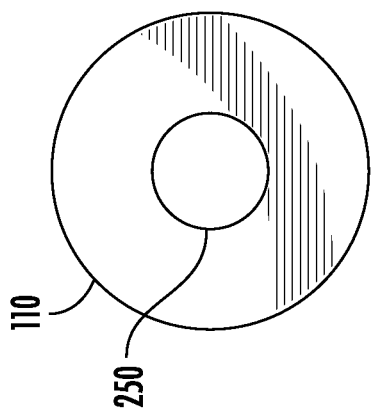
Figure 4A:
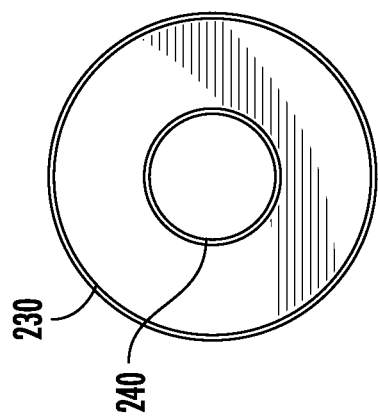

FIG. 4A provides a side cross-sectional view of reinforcement layers of a roller in accordance with an example embodiment of the present disclosure.

FIG. 4B provides a side cross-sectional view of surface treatment layers of a roller in accordance with an example embodiment of the present disclosure.

Figure 4C:
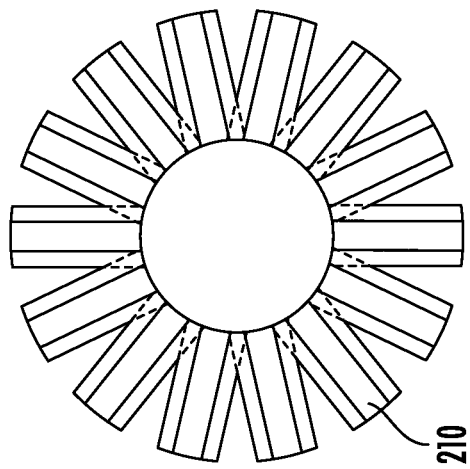

FIG. 4C provides a side cross-sectional view of a corrugated material layer of a roller in accordance with an example embodiment of the present disclosure.

FIG. 4D provides a front view of a corrugated material layer of a roller in accordance with an example embodiment of the present disclosure.

FIG. 5A provides a front cross-sectional view of a roller filled with a plurality of corrugated sheets in accordance with an example embodiment of the present disclosure.

FIG. 5B provides a front view of a plurality of corrugated sheets joined together in accordance with an example embodiment of the present disclosure.

FIG. 5C provides a front view of an individual corrugated sheet in accordance with an example embodiment of the present disclosure.

Figure 6D:
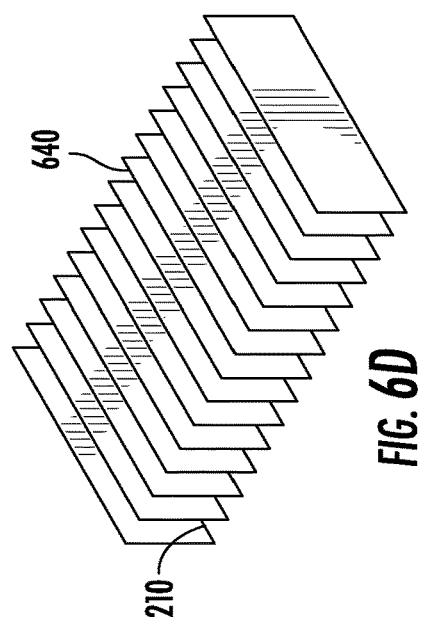
Figure 6B:
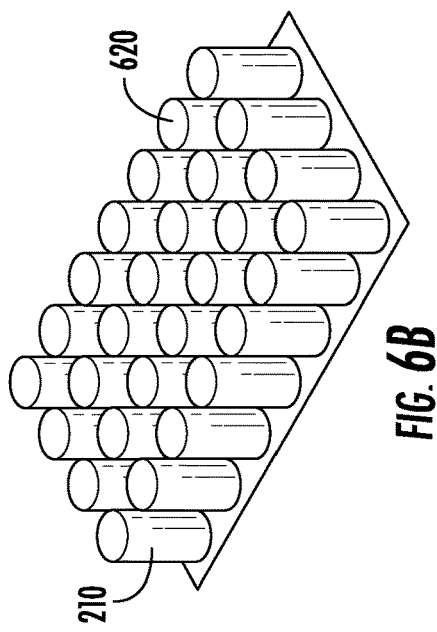
Figure 6C:
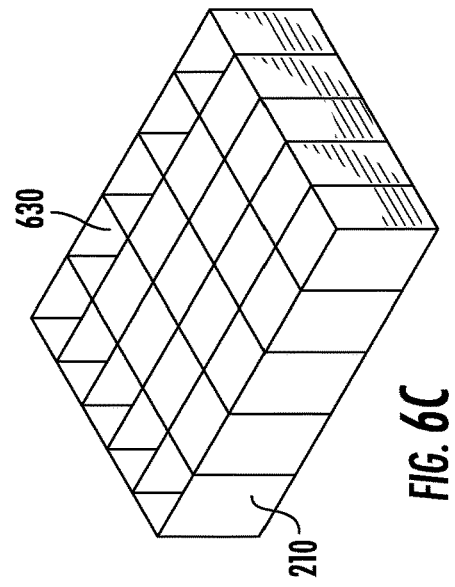
Figure 6A:
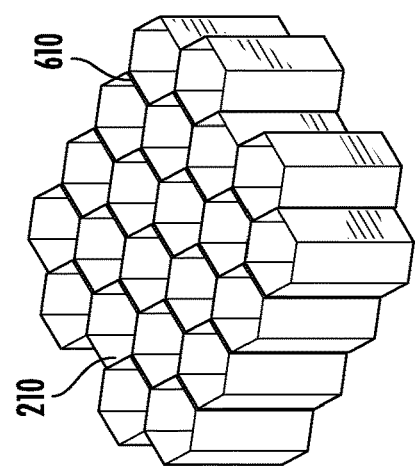

FIG. 6A provides a perspective view of a honeycomb reinforcement structure in accordance with an example embodiment of the present disclosure.

FIG. 6B provides a perspective view of a bubble reinforcement structure in accordance with an example embodiment of the present disclosure.

FIG. 6C provides a perspective view of a rectangular reinforcement structure in accordance with an example embodiment of the present disclosure.

FIG. 6D provides a perspective view of a plate reinforcement structure in accordance with an example embodiment of the present disclosure.

Figure 7:
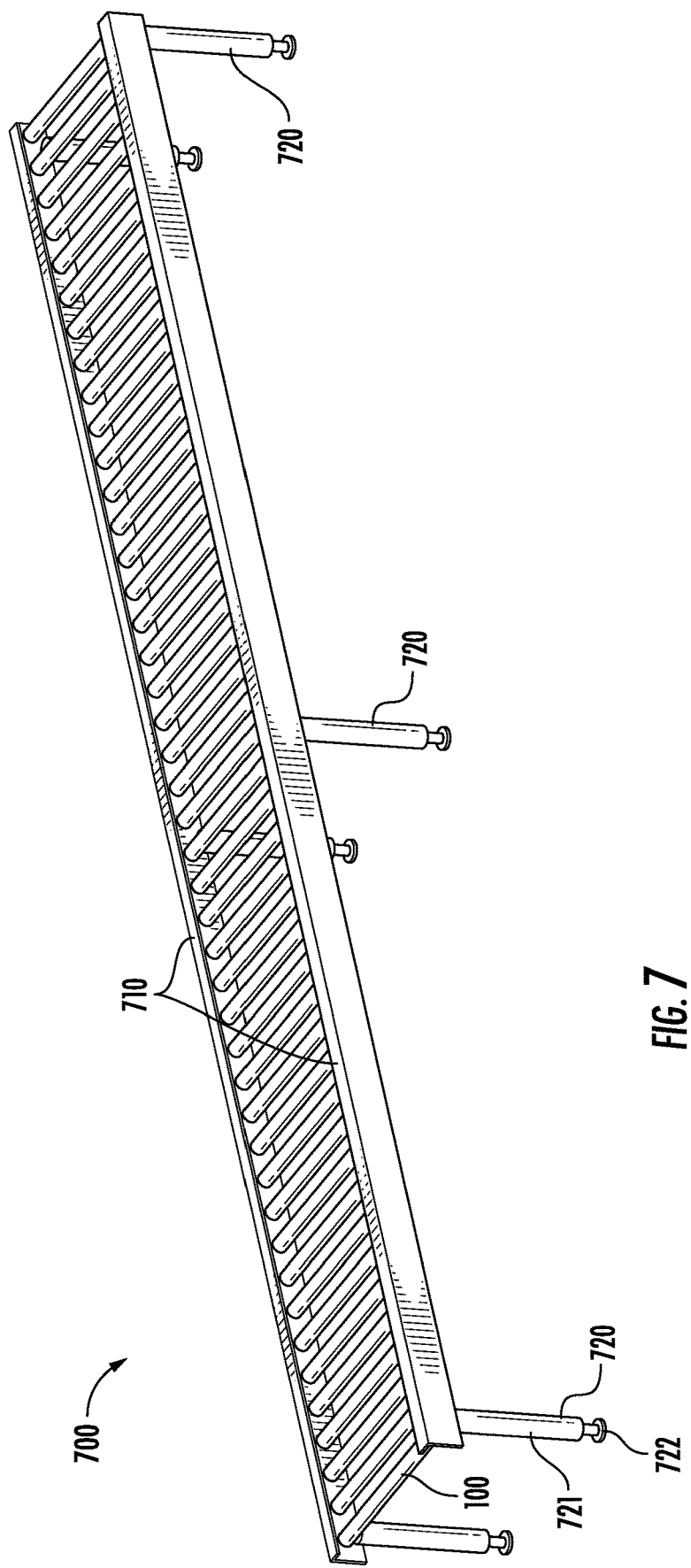

FIG. 7 provides a perspective view of a roller conveyor system in accordance with an example embodiment of the present disclosure.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein. As used herein, coupling can be accomplished through welding one component to another component.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

It is desirable, in some examples, for rollers to be lightweight and produce a low amount of noise while in use. Embodiments of the present disclosure include, but are not limited to, a corrugated reinforced plastic roller that is lightweight and does not create excessive noise. In some examples, noise levels may be reduced by 10% to 30% compared to existing technologies.

Turning now to FIG. 1, an example roller 100 is provided. In one or more embodiments, the example roller 100 has a cylindrical shape. The example roller 100 may extend between a first end and a second end.

In one or more embodiments, a roller 100 has an outer layer 110 having a cylindrical shape. For example, outer layer 110 may extend between the first end and the second end. In some examples, outer layer 110 has a diameter equal to the diameter of the roller 100 (e.g., 2 inches). In some examples, outer layer 110 has a hollow cylindrical shape.

In one or more embodiments, the outer layer 110 is a surface treatment layer. For example, the outer layer 110 may be surface treated with physical and/or chemical methods in order to improve the roller's coefficient of friction, smoothness, hardness, appearance, texture, function, and/or the like.

In one or more embodiments, outer layer 110 is made of a polymer. For example, outer layer 110 may be made of a plastic material such as polypropylene, polytetrafluoroethylene, polyvinyl chloride, and/or the like. In some outer layer 110 may include additives such as glass fiber, minerals, chopped strand glass fiber, and/or the like.

In one or more embodiments, a roller has a first bearing 120. For example, the first bearing 120 may be disposed at the first end of roller 100. In some examples, first bearing 120 has a circular shape. For example, first bearing 120 may have a diameter equal to the diameter of roller 100 and/or outer layer 110 (e.g., 2 inches).

In one or more embodiments, first bearing 120 is made of a hard material. For example, first bearing 120 may be made of ferrous or non-ferrous metals. In some examples, first bearing 120 is made of a rigid polymer such as polypropylene, polyoxymethylene, nylon, and/or the like.

In one or more embodiments, first bearing 120 is coupled to the first end of roller 100. For example, first bearing 120 may be coupled to outer layer 110 of roller 100 and/or materials inside of outer layer 110. For example, first bearing 120 may be coupled to a corrugated plastic filling inside roller 100. As another example, first bearing 120 may be coupled to a motor placed inside of roller 100. In some examples, first bearing 120 is fused to roller 100 via ultrasonic welding, friction welding, press fitting, and/or the like.

In one or more embodiments, first bearing 120 includes a shaft 125. In some examples, shaft 125 extends away from roller 100. In some examples, shaft 125 is a hex shaft. In other examples, shaft 125 may be a different shape, such as circular, rectangular, and/or the like.

In one or more embodiments, shaft 125 is made of the same material as the rest of first bearing 120. For example, in an embodiment where first bearing 120 is made of metal, shaft 125 is made of metal.

In one or more embodiments, a roller has a second bearing 130. For example, the second bearing 130 may be disposed at the second end of roller 100. In some examples, second bearing 130 has a circular shape. For example, second bearing 130 may have a diameter equal to the diameter of roller 100 and/or outer layer 110 (e.g., 2 inches).

In one or more embodiments, second bearing 130 is made of a hard material. For example, second bearing 130 may be made of ferrous or non-ferrous metals. In some examples, second bearing 130 is made of a rigid polymer such as polypropylene, polyoxymethylene, nylon, and/or the like.

In one or more embodiments, second bearing 130 is coupled to the second end of roller 100. For example, second bearing 130 may be coupled to outer layer 110 of roller 100 and/or materials inside of outer layer 110. For example, second bearing 130 may be coupled to a corrugated plastic filling inside roller 100. As another example, second bearing 130 may be coupled to a motor placed inside of roller 100. In one or more embodiments, second bearing 130 is fused to roller 100 via ultrasonic welding, friction welding, press fitting, and/or the like.

In one or more embodiments, second bearing 130 includes a shaft 135. In some examples, shaft 135 extends away from roller 100. In some examples, shaft 135 is a hex shaft. In other examples, shaft 135 may be a different shape, such as circular, rectangular, and/or the like.

In one or more embodiments, shaft 135 is made of the same material as the rest of second bearing 130. For example, in an embodiment where second bearing 130 is made of metal, shaft 135 is made of metal.

In one or more embodiments, shaft 125 and/or shaft 135 may extend into the roller 100. For example, shaft 125 may connect with shaft 135 inside of roller 100. In some examples, shaft 125 and/or shaft 135 extend fully between first bearing 120 and second bearing 130.

Turning now to FIG. 2A, a front cross sectional view of an example roller 100 with a hollow center 220 is provided in accordance with an example embodiment of the present disclosure. In this example, roller 100 includes a corrugated plastic filling 210 and a hollow center 220.

In one or more embodiments, corrugated plastic filling 210 is made of a polymer such as polypropylene. In some examples, corrugated plastic filling 210 includes additives. In alternative embodiments, corrugated plastic filling 210 may be formed from wood, rubber materials, wood and polymer composite materials, and/or other materials that provide reinforcement to roller 100.

For example, corrugated plastic filling 210 may be made of a lightweight plastic material that provides reinforcement to roller 210. In some examples, corrugated plastic filling 210 is lighter in weight than metal materials. In some examples, corrugated plastic filling 210 provides toughness to roller 100. In some examples, corrugated plastic filling 210 dampens noise produced by roller 100.

In one or more embodiments, corrugated plastic filling 210 is shaped into alternating ridges and/or grooves. For example, corrugated plastic filling 210 is textured. For example, corrugated plastic filling 210 may include a honeycomb structure, a bubble structure, a series of rectangular grooves, a series of plate-shaped grooves, and/or the like.

In one or more embodiments, corrugated plastic filling 210 has a cylindrical shape. In some examples, corrugated plastic filling 210 defines a hollow center 220. In some examples, corrugated plastic filling 210 is formed into a cylindrical shape by a thermoforming process. For example, corrugated plastic filling 210 may be formed into a cylindrical shape by pressure and heat. In some examples, outer layer 110 is wrapped around the corrugated plastic filling 210. For example, corrugated plastic filling 210 may be positioned inside the outer layer 110. In some examples, corrugated plastic filling 210 may be directly in contact with an inside surface of the outer layer 210. In other examples, the outer layer 110 and corrugated plastic filling 210 may be joined by a thermoforming process to a connecting layer positioned in between the outer layer 110 and the corrugated plastic filling 210.

In one or more example embodiments, corrugated plastic filling 210 is lighter in weight than metal materials. In one or more example embodiments, corrugated plastic filling 210 increases the flexural strength of roller 100 by 50% to 100% compared with a non-reinforced roller. In one or more embodiments, corrugated plastic filling 210 dampens noise produced by roller 100 by 10% to 30% compared to existing technologies.

Turning now to FIG. 2B, close-up front cross-sectional view of an example roller 100 is provided. In this example, corrugated plastic filling 210 is positioned between a first reinforcement layer 230 and a second reinforcement layer 240. In this example, the corrugated plastic filling 210, first reinforcement layer 230, and second reinforcement layer 240 are positioned between an outer layer 110 and an inner layer 250.

In one or more embodiments, a first reinforcement layer 230 is positioned between the outer layer 110 and the corrugated plastic filling 210. In some examples, first reinforcement layer 230 is sandwiched in between outer layer 110 and corrugated plastic filling 210 by a thermoforming process. In some examples, first reinforcement layer 230 has a cylindrical shape. For example, first reinforcement layer 230 may extend between the first end and the second end of roller 100.

In one or more embodiments, first reinforcement layer 230 is made of fiberglass, and in other examples, first reinforcement layer 230 may be made of any other plastic reinforcement material. In some examples, first reinforcement layer 210 provides strength and structural integrity to roller 100.

In one or more embodiments, a second reinforcement layer 240 is positioned between the inner layer 250 and the corrugated plastic filling 210. In some examples, second reinforcement layer 240 is sandwiched in between inner layer 250 and corrugated plastic filling 210 by a thermoforming process. In some examples, second reinforcement layer 240 has a cylindrical shape. For example, second reinforcement layer 240 may extend between the first end and the second end of roller 100.

In one or more embodiments, second reinforcement layer 240 is made of fiberglass, and in other examples, second reinforcement layer 240 may be made of any other plastic reinforcement material. In some examples, second reinforcement layer 240 provides strength and structural integrity to roller 100.

In one or more embodiments, a roller 100 has an inner layer 250 having a cylindrical shape. In some examples, inner layer 250 may have a hollow cylindrical shape. In some examples, inner layer 250 may extend between the first end and the second end. In some examples, inner layer 250 is positioned between the second reinforcement layer 250 and the hollow center 220. In some examples, inner layer 250 has a diameter smaller than the diameter of the roller 100. For example, an inner layer 250 may have a diameter equal to 15% of the diameter of outer layer 110. For example, in an embodiment where roller 100 has a diameter of 2 inches, inner layer 250 may have a diameter of 0.25 inches.

In one or more embodiments, the inner layer 250 is a surface treatment layer. For example, the inner layer 250 may be surface treated to increase wear resistance of inner layer 250. For example, the inner layer 250 may be surface treated to provide reinforcement over an external load and/or suppress noise reflection inside of roller 100.

In one or more embodiments, inner layer 250 is made of a polymer material. For example, inner layer 250 may be made of a plastic material such as polypropylene polytetrafluoroethylene, polyvinyl chloride, and/or the like. In some examples, surface treatment layers 530 may include additives such as glass fiber, minerals, chopped strand glass fiber, and/or the like.

Turning now to FIG. 3, an exploded view of an example roller 100 is provided in accordance with example embodiments of the present disclosure. In some examples, the roller 100 includes a plurality of layers positioned in between first bearing 120 and second bearing 130. In some examples, the corrugated plastic filling 210 is placed within a first reinforcement layer 230. Additionally or alternatively, corrugated plastic filling 210 is wrapped around a second reinforcement layer 240. Additionally or alternatively, an outer layer 110 is wrapped around first reinforcement layer 230. Additionally or alternatively, an inner layer 250 is positioned within second reinforcement layer 240. In some examples, inner layer 250, second reinforcement layer 240, corrugated plastic filling 210, first reinforcement layer 230, and outer layer 210 extend between first bearing 120 and second bearing 130.

Turning now to FIG. 4A, a side cross-section view of a first reinforcement layer 230 and a second reinforcement layer 240 is provided in accordance with example embodiments of the present disclosure. In some examples, second reinforcement layer 240 has a smaller diameter than first reinforcement layer 230. For example, second reinforcement layer 240 may have a diameter equal to 15% of a diameter of first reinforcement layer 230. As another example, first reinforcement layer 230 may have a diameter of 2 inches and second reinforcement layer 240 may have a diameter of 0.25 inches.

Turning now to FIG. 4B, a side cross-section view of an outer layer 110 and an inner layer 250 is provided in accordance with example embodiments of the present disclosure. In some examples, inner layer 250 has a smaller diameter than outer layer 110. For example, inner layer 250 may have a diameter equal to 15% of a diameter of outer layer 110. As another example, outer layer 110 may have a diameter of 2 inches and inner layer 250 may have a diameter of 0.25 inches.

Turning now to FIG. 4C, a side cross-section view of a corrugated plastic filling 210 is provided in accordance with example embodiments of the present disclosure. In some examples, corrugated plastic filling 210 fills a space between a first reinforcement layer 230 and a second reinforcement layer 240. In some examples, corrugated plastic filling 210 may have a honeycomb structure, a bubble structure, a rectangular structure, a plate structure, and/or the like.

Turning now to FIG. 4D, a front view of a corrugated plastic filling 210 is provided in accordance with example embodiments of the present disclosure. In some examples, the corrugated plastic filling 210 is shaped as a series of parallel cylinders disposed between the first bearing 120 and the second bearing 130. As shown in the example in FIG. 4D, the series of parallel cylinders may be spaced apart.

In one or more embodiments, the corrugated plastic filling 210 is shaped as a continuous hollow cylinder. For example, the corrugated plastic filling may include the series of parallel cylinders joined together.

Turning now to FIG. 5A, a front cross sectional view of an example roller 100 filled with a plurality of corrugated sheets 510 is provided. In this example, corrugated plastic filling 210 is made up of a plurality of corrugated sheets 510.

In one or more embodiments, outer layer 110 is a plastic tube configured to house the plurality of corrugated sheets 510. For example, the outer layer 110 may include polytetrafluoroethylene, polyvinyl chloride, and/or the like.

In one or more embodiments, the plurality of corrugated sheets 510 are stacked such that a space inside the outer layer 110 and between the first bearing 120 and the second bearing 130 is filled. For example, corrugated sheets 510 may be stacked in a direction extending between first bearing 120 and second bearing 130. In other examples, corrugated sheets 510 are stacked in a direction perpendicular to a direction between first bearing 120 and second bearing 130. For example, each of corrugated sheets 510 may extend fully between first bearing 120 and second bearing 130 and be stacked to fill the outer layer 110. In other examples, corrugated sheets 510 do not extend fully between first bearing 120 and second bearing 130. In these examples, corrugated sheets 510 may be stacked both in the direction between first bearing 120 and second bearing 130 and perpendicularly to the direction between first bearing 120 and second bearing 130. For example, corrugated sheets 510 may be stacked such that a space a space inside the outer layer 110 and between the first bearing 120 and the second bearing 130 is filled.

In one or more embodiments, as shown in FIG. 5A, one or more of the plurality of corrugated sheets 510 may define a circular shape. Additionally or alternatively, one or more of the plurality of corrugated sheets 510 may be square, rectangular, oval, triangular, hexagonal, and/or the like. In some examples, the plurality of corrugated sheets 510 may comprise a plurality of uniform or different shapes.

Turning now to FIG. 5B, a front view of a plurality of corrugated sheets 510 is provided in accordance with example embodiments of the present disclosure. In some examples, the plurality of corrugated sheets 510 are joined together. For example, the plurality of corrugated sheets 510 may be fused together by an adhesive, by stacking under heat and pressure, and/or the like. In some, the plurality of corrugated sheets 510 are joined together and then pushed into the outer layer 110.

In one or more embodiments, the plurality of corrugated sheets 510 are each made of a corrugated plastic material (e.g., polypropylene). For example, each of corrugated sheets 510 may have a honeycomb, bubble, rectangular, plate, and/or the like structure. In some examples, each of corrugated sheets 510 shares the same structure. In alternative examples, the plurality of corrugated sheets 510 include corrugated sheets with varied structures. The plurality of corrugated sheets 510 may provide reinforcement when an example roller 100 is bearing weight.

Turning now to FIG. 5C, an example individual corrugated sheet 510 is provided. For example, the individual corrugated sheet 510 may be any of the plurality of corrugates sheets 510 depicted in FIGS. 5A-5B.

In one or more embodiments, each of the plurality of corrugated sheets 510 is disposed between a two reinforcement layers 520. For example, the reinforcement layers 520 each cover a side of corrugated sheet 510. In this example, the reinforcement layers 520 are made of fiberglass or another plastic reinforcement material which provides strength and structural integrity to corrugated sheet 510.

In one or more embodiments, each of the plurality of corrugated sheets 510 and the surrounding reinforcement layers 520 are disposed between two surface treatment layers 530. For example, surface treatment layers 530 may be thermally fused, thermoformed, compression molded, and/or the like onto the corrugated sheet 510 and/or the reinforcement layers 520. In some examples, surface treatment layers 530 are configured to increase the strength of corrugated sheet 510. In some examples, surface treatment layers 530 are configured to be joined to a surface treatment layer of a different corrugated sheet.

In one or more embodiments, surface treatment layers 530 may be made of a polymer (e.g., a plastic material). In some examples, surface treatment layers 530 may include additives such as glass fiber, minerals, chopped strand glass fiber, and/or the like.

Turning now to FIG. 6A, an example structure of a corrugated plastic filling 210 is provided. In this example, corrugated plastic filling 210 includes a honeycomb reinforcement structure 610. In some examples, honeycomb reinforcement structure 610 may be thermoformed into a hollow cylindrical shape. In other examples, honeycomb reinforcement structure 610 may be cut into a plurality of corrugated sheets 510.

In one or more embodiments, honeycomb reinforcement structure 610 is made of a plastic material (e.g., polypropylene). In some examples, honeycomb reinforcement structure 610 provides strength to a roller 100. In some examples, gaps in the honeycomb reinforcement structure 610 allow the roller 100 to be lighter in weight. In some examples, honeycomb reinforcement structure 610 dampens noise produced by roller 100.

Turning now to FIG. 6B, an alternative example structure of a corrugated plastic filling 210 is provided. In this example, corrugated plastic filling 210 includes a bubble reinforcement structure 620. In some examples, bubble reinforcement structure 620 may be thermoformed into a hollow cylindrical shape. In other examples, bubble reinforcement structure 620 may be cut into a plurality of corrugated sheets 510.

In one or more embodiments, bubble reinforcement structure 620 is made of a plastic material (e.g., polypropylene). In some examples, bubble reinforcement structure 620 provides strength to a roller 100. In some examples, gaps in the bubble reinforcement structure 620 allow the roller 100 to be lighter in weight. In some examples, bubble reinforcement structure 620 dampens noise produced by roller 100.

Turning now to FIG. 6C, an alternative example structure of a corrugated plastic filling 210 is provided. In this example, corrugated plastic filling 210 includes a rectangular reinforcement structure 630. In some examples, rectangular reinforcement structure 630 may be thermoformed into a hollow cylindrical shape. In other examples, rectangular reinforcement structure 630 may be cut into a plurality of corrugated sheets 510.

In one or more embodiments, rectangular reinforcement structure 630 is made of a plastic material (e.g., polypropylene). In some examples, rectangular reinforcement structure 630 provides strength to a roller 100. In some examples, gaps in the rectangular reinforcement structure 630 allow the roller 100 to be lighter in weight. In some examples, rectangular reinforcement structure 630 dampens noise produced by roller 100.

Turning now to FIG. 6D, an alternative example structure of a corrugated plastic filling 210 is provided. In this example, corrugated plastic filling 210 includes a plate reinforcement structure 640. In some examples, plate reinforcement structure 640 may be thermoformed into a hollow cylindrical shape. In other examples, plate reinforcement structure 640 may be cut into a plurality of corrugated sheets 510.

In one or more embodiments, plate reinforcement structure 640 is made of a plastic material (e.g., polypropylene). In some examples, plate reinforcement structure 640 provides strength to a roller 100. In some examples, gaps in the plate reinforcement structure 640 allow the roller 100 to be lighter in weight. In some examples, plate reinforcement structure 640 dampens noise produced by roller 100.

Turning now to FIG. 7, an example roller conveyor system 700 is provided. In one or more embodiments, a roller conveyor system 700 includes one or more conveyor frames 710, one or more conveyor legs 720, and one or more rollers 100.

In one or more embodiments, a roller conveyor system 700 includes two conveyor frames 710. In some examples, the conveyor frames 710 are positioned perpendicularly to the one or more rollers 100. In some examples, the conveyor frames 710 extend parallel to each other. In some examples, the conveyor frames are coupled to shafts (e.g., shafts 125 and 135) attached to the one or more rollers 100.

In one or more embodiments, at least one conveyor frame 710 is coupled to one or more conveyor legs 720. In some examples, each of the one or more conveyor legs 720 extends perpendicularly to both the one or more rollers 100 and the one or more conveyor frames 710. In some examples, each of the conveyor legs 720 includes a bar portion 721 and a foot portion 722. In some examples, the foot portion 722 shaped to provide surface contact with the ground (e.g., a circular shape). In some examples, the foot portion 722 is placed at an end of the bar portion 721 distal to conveyor frame 710.

In one or more embodiments, the conveyor frames 710, bar portion 721, and/or foot portion 722 may be made of metal. In alternative examples, foot portion 722 may be made of plastic. In still other examples, foot portion 722 may be made of rubber.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A roller, comprising:
    an outer layer having a cylindrical shape, wherein the outer layer extends between a first end and a second end;
    a first bearing disposed at the first end;
    a second bearing disposed at the second end; and
    a corrugated plastic filling, wherein the outer layer is wrapped around the corrugated plastic filling, wherein the corrugated plastic filling comprises a plurality of corrugated sheets, wherein each of the plurality of corrugated sheets is disposed between two reinforcement layers, and wherein each of the plurality of corrugated sheets is further disposed between two surface treatment layers.

2. The roller of claim 1, wherein the corrugated plastic filling defines a cylindrical shape having a hollow center.

3. The roller of claim 2, wherein the roller further comprises a first reinforcement layer positioned between the outer layer and the corrugated plastic filling.

4. The roller of claim 2, wherein the roller further comprises a second reinforcement layer positioned between the corrugated plastic filling and the hollow center.

5. The roller of claim 4, wherein the roller further comprises an inner layer positioned between the second reinforcement layer and the hollow center.

6. The roller of claim 5, wherein at least one of the outer layer or the inner layer comprises a surface treatment layer.

7. The roller of claim 1, wherein the plurality of corrugated sheets are stacked such that a space inside the outer layer and between the first bearing and the second bearing is filled.

8. The roller of claim 1, wherein each of the plurality of corrugated sheets defines a circular shape.

9. The roller of claim 1, wherein each of the plurality of corrugated sheets is stacked in a direction extending between the first bearing and the second bearing.

10. The roller of claim 1, wherein the plurality of corrugated sheets are joined together.

11. The roller of claim 1, wherein the outer layer comprises plastic.

12. The roller of claim 1, wherein at least one of the first bearing or the second bearing comprises a hex shaft.

13. The roller of claim 1, wherein the corrugated plastic filling comprises at least one of a honeycomb reinforcement structure, a bubble reinforcement structure, a rectangular reinforcement structure, or a plate reinforcement structure.

14. A roller conveyor system, comprising:
    one or more conveyor frames;
    one or more conveyor legs; and
    one or more rollers, each of the one or more rollers comprising:
    an outer layer having a cylindrical shape, wherein the outer layer extends between a first end and a second end;
    a first bearing disposed at the first end;
    a second bearing disposed at the second end; and
    a corrugated plastic filling, wherein the outer layer is wrapped around the corrugated plastic filling, wherein the corrugated plastic filling comprises a plurality of corrugated sheets, wherein each of the plurality of corrugated sheets is disposed between two reinforcement layers, and wherein each of the plurality of corrugated sheets is further disposed between two surface treatment layers.

15. The roller conveyor system of claim 14, wherein the corrugated plastic filling defines a cylindrical shape having a hollow center.

16. The roller conveyor system of claim 14, wherein each of the one or more rollers further comprises a first reinforcement layer positioned between the outer layer and the corrugated plastic filling.

17. The roller conveyor system of claim 15, wherein each of the one or more rollers further comprises a second reinforcement layer positioned between the corrugated plastic filling and the hollow center.

* * * * *